United States Patent
Shimazawa

(10) Patent No.: US 11,252,143 B2
(45) Date of Patent: Feb. 15, 2022

(54) AUTHENTICATION SYSTEM, AUTHENTICATION SERVER AND AUTHENTICATION METHOD

(71) Applicant: WingArc1st Inc., Tokyo (JP)

(72) Inventor: Ko Shimazawa, Tokyo (JP)

(73) Assignee: WingArc1st Inc., Tokyo (JP)

( * ) Notice: Subject to any disclaimer, the term of this patent is extended or adjusted under 35 U.S.C. 154(b) by 322 days.

(21) Appl. No.: 16/666,926

(22) Filed: Oct. 29, 2019

(65) Prior Publication Data
US 2020/0137044 A1 Apr. 30, 2020

(30) Foreign Application Priority Data
Oct. 30, 2018 (JP) .............................. JP2018-204445

(51) Int. Cl.
*H04L 29/06* (2006.01)
(52) U.S. Cl.
CPC ........ *H04L 63/0823* (2013.01); *H04L 63/083* (2013.01)
(58) Field of Classification Search
CPC ........................... H04L 63/0823; H04L 63/083
See application file for complete search history.

(56) References Cited

U.S. PATENT DOCUMENTS

| | | | | |
|---|---|---|---|---|
| 9,032,498 | B1 * | 5/2015 | Ben Ayed | G06F 21/35 726/9 |
| 9,160,724 | B2 * | 10/2015 | Rathod | H04L 63/062 |
| 10,958,433 | B2 * | 3/2021 | Medvinsky | H04L 9/0822 |
| 2004/0015690 | A1 * | 1/2004 | Torigai | G06Q 20/383 713/156 |
| 2007/0055865 | A1 * | 3/2007 | Kakii | H04L 9/3263 713/156 |
| 2014/0047510 | A1 * | 2/2014 | Belton | H04W 12/069 726/4 |
| 2015/0244706 | A1 * | 8/2015 | Grajek | H04L 63/0815 726/6 |

(Continued)

FOREIGN PATENT DOCUMENTS

JP 2009098761 A 5/2009

OTHER PUBLICATIONS

Satoshi Uda, Challenges of Deploying PKI based Client Digital Certification, Nov. 2016, ACM, pp. 55-60. (Year: 2016).*

(Continued)

*Primary Examiner* — Luu T Pham
*Assistant Examiner* — Fahimeh Mohammadi
(74) *Attorney, Agent, or Firm* — Polsinelli PC

(57) ABSTRACT

A certificate issued by an authentication server 200 in response to a request from a client terminal 100 is stored in an issued certificate storage unit 113, and the stored certificate is transmitted to the authentication server 200 together with device information to execute first authentication and then a user ID/password is transmitted to the authentication server 200 to execute second authentication, so that it is possible to perform the first authentication using a certificate and perform the second authentication using a user ID/password without setting up the service usage environment in which the certificate of the client terminal 100 and the user ID/password are stored in advance in the authentication server 200 so as to be associated with each other and the certificate is stored in advance in each client terminal 100.

8 Claims, 5 Drawing Sheets

(56) References Cited

U.S. PATENT DOCUMENTS

| | | | |
|---|---|---|---|
| 2016/0134621 A1* | 5/2016 | Palanigounder | H04L 63/0823 |
| | | | 713/156 |
| 2016/0241405 A1* | 8/2016 | Jeong | H04L 63/0428 |
| 2017/0264437 A1* | 9/2017 | Fu | H04L 63/083 |
| 2017/0289799 A1* | 10/2017 | Hawkes | H04L 63/083 |
| 2019/0132309 A1* | 5/2019 | Wei | H04L 63/126 |
| 2021/0306161 A1* | 9/2021 | Medvinsky | H04L 9/0822 |

OTHER PUBLICATIONS

Larry Holt, Increasing Real-World Security of User IDs and Passwords, Sep. 2011, ACM, pp. 34-41. (Year: 2011).*

Hung-Min Sun et al., oPass: A User Authentication Protocol Resistant to Password Stealing and Password Reuse Attacks, Sep. 29, 2011, IEEE, vol. 7, Issue: 2. pp. 651-663. (Year: 2011).*

Binod Vaidya et al., Device Authentication Mechanism for Smart Energy Home Area Networks, Jan. 9-12, 2011, IEEE, pp. 787-788. (Year: 2011).*

* cited by examiner

AUTHENTICATION SYSTEM, AUTHENTICATION SERVER AND AUTHENTICATION METHOD

CROSS REFERENCE TO RELATED APPLICATIONS

This application claims priority to Application No. 2018-204445 filed in Japan on 30 Oct. 2018. The entire contents of this application is hereby incorporated by reference.

BACKGROUND OF THE INVENTION

Technical Field

The present invention relates to an authentication system, an authentication server, and an authentication method, and is particularly suitable for use in an authentication system that performs first authentication using a certificate and second authentication using a user ID/password.

Description of Related Art

Conventionally, in a case where a client terminal accesses a web server, access may be permitted only to a legitimate client terminal. In order to check whether or not the client terminal is a legitimate client terminal, authentication using a user ID and a password is performed in many cases. In addition, in an environment where stronger security control is required, IP restriction or a virtual private network (VPN) is used.

In the case of authentication using a user ID/password, the authentication can basically be used on a client terminal when there is a web browser. Therefore, the authentication using a user ID/password can be easily introduced. In recent years, however, the resolution of a security camera has also increased, and the number of cases in which a user ID/password is stolen is increasing. For this reason, there is a weakness in terms of the strength of security.

On the other hand, the use of IP restriction or VPN can improve the strength of security, but there is a problem that convenience for users is reduced. That is, in the case of the IP restriction, authentication is performed using the IP address of a connection source. Therefore, there is no problem with a connection from an office where a fixed IP address is used, but the convenience is reduced in a connection from a place where a variable IP address is used at a satellite base. In addition, in the case of the VPN, setup of a VPN environment is required for each terminal, and a response on the service side is required. Therefore, there have been problems that it takes a lot of efforts to use the service and a lot of management costs occur.

Note that, conventionally, a system that performs authentication using a user ID/password and a client certificate has been proposed for the purpose of performing client authentication relatively easily (for example, refer to JP-A-2009-98761). JP-A-2009-98761 discloses that a client certificate using information unique to a client terminal is stored in the client terminal and second authentication using a user ID/password is performed after first authentication using the client certificate.

Specifically, in the authentication system described in JP-A-2009-98761, a client certificate and a user ID/password are stored in advance in a user database of an authentication server so as to be associated with each other, and the authentication server reads out the user ID/password from the user database and transmits the user ID/password to a web server to perform the second authentication after succeeding in the first authentication in the authentication server using the client certificate. Therefore, since a user only needs to directly perform authentication using a client certificate, client authentication can be performed relatively easily.

SUMMARY OF THE INVENTION

However, in order to use the authentication system described in JP-A-2009-98761, it is necessary to set up a service usage environment in which a client certificate and a user ID/password are stored in advance in a user database of an authentication server so as to be associated with each other and the client certificate is stored in advance in each client terminal. Therefore, there have been problems that it takes a lot of efforts to use the service and a lot of management costs occur.

The invention has been made to solve such problems, and an object of the invention is to realize high security without special setup by using a terminal authentication technique without using a mechanism, such as IP restriction or a VPN.

In order to solve the aforementioned problems, in the invention, an authentication server issues a certificate in response to a request from a client terminal, and the issued certificate is stored in a storage medium inside the client terminal. Then, the certificate stored in the storage medium is transmitted from the client terminal to the authentication server together with device information to execute first authentication. Then, after the first authentication is successful, a user ID and a password are transmitted from the client terminal to the authentication server to execute second authentication.

According to the invention configured as described above, when necessary for each client terminal that desires to be authenticated, by transmitting a certificate issuance request to the authentication server to issue a certificate and storing the certificate in the client terminal, it is possible to perform the first authentication using the certificate at an arbitrary timing thereafter and perform the second authentication using the user ID/password after the first authentication. Therefore, it is possible to perform the first authentication using a certificate and perform the second authentication using a user ID/password without setting up the service usage environment in which the certificate of the client terminal and the user ID/password are stored in advance in the authentication server so as to be associated with each other and the client certificate is stored in advance in each client terminal. Therefore, according to the invention, it is possible to realize high security without special setup by using a terminal authentication technique without using a mechanism, such as IP restriction or a VPN.

DETAILED DESCRIPTION OF THE INVENTION

First Embodiment

Figure 1:
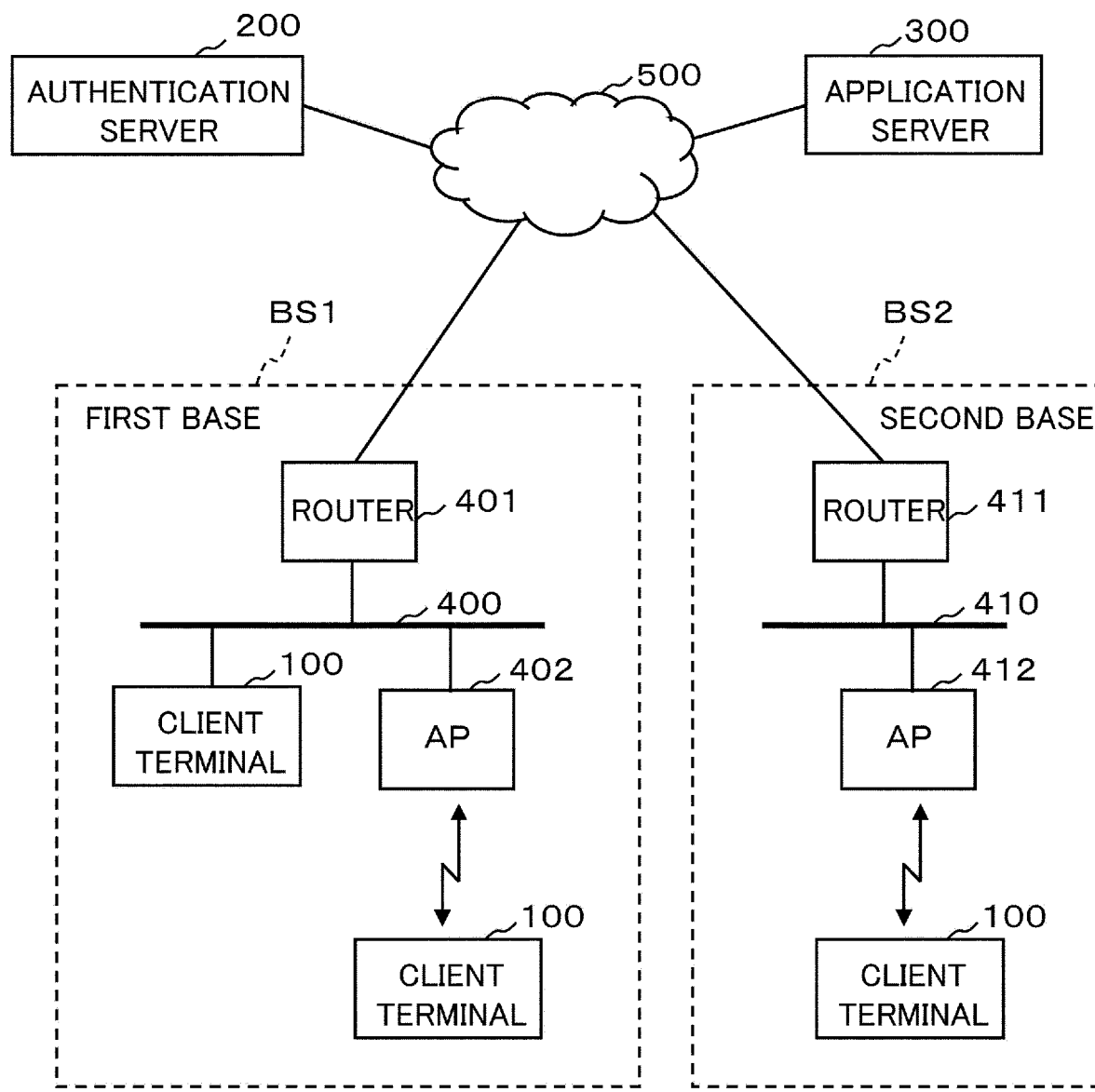
FIG. 1 is a diagram illustrating a configuration example of a service providing system including an authentication system according to a first embodiment.

Hereinafter, a first embodiment of the invention will be described with reference to diagrams. FIG. 1 is a diagram illustrating a configuration example of a service providing system including an authentication system according to the first embodiment. The authentication system according to the first embodiment is configured to include a client terminal 100 including a web browser and an authentication server 200 that performs authentication in response to a request from the client terminal 100.

In addition, in addition to the authentication system, the service providing system is configured to further include an application server 300 (corresponding to a web server in the claims). The application server 300 executes predetermined web application processing in response to a request from a web browser of the client terminal 100 in a case where web-based authentication performed between the web browser of the client terminal 100 and the authentication server 200 is successful.

The client terminal 100 is configured to be able to access Internet 500 from a plurality of bases BS1 and BS2 and be connectable to the authentication server 200 and the application server 300.

For example, the first base BS1 is a network having an in-house LAN 400 constructed in a company to which a user belongs. The client terminal 100 is connected to the in-house LAN 400 by cable, and can be connected to the Internet 500 through a router 401 connected to the in-house LAN 400. In addition, the client terminal 100 is wirelessly connected to an access point (AP 402) connected to the in-house LAN 400, and can be connected to the Internet 500 from the AP 402 through the router 401.

The second base BS2 is a network having an external LAN 410 constructed outside the company to which the user belongs. The client terminal 100 is wirelessly connected to an AP 412 connected to the external LAN 410, and can be connected to the Internet 500 from the AP 412 through a router 411. Note that, although only one second base BS2 is illustrated for simplicity of explanation, there are a plurality of second bases BS2 in practice.

When accessing the application server 300 from the second base BS2 through the Internet 500, it is necessary to perform authentication (first authentication using a certificate and second authentication using a user ID/password to be described later) by the authentication server 200. On the other hand, when accessing the application server 300 from the first base BS1 through the Internet 500, the authentication by the authentication server 200 may be unnecessary, but only the second authentication may be performed. In addition, similarly to the case of accessing from the second base BS2, both the first authentication and the second authentication may be performed. The following explanation will be given on the assumption that both the first authentication and the second authentication are performed.

Figure 2:
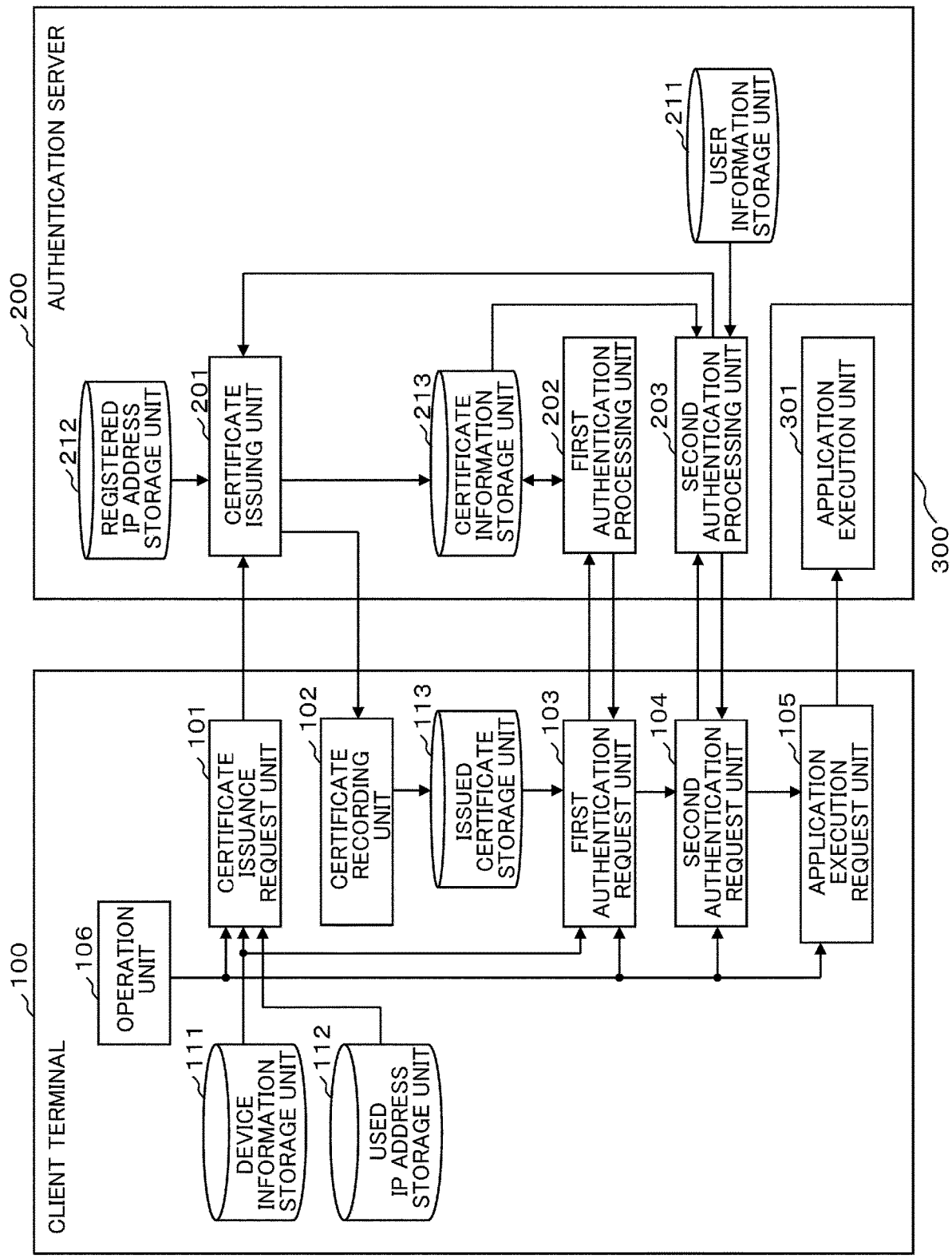
FIG. 2 is a diagram illustrating a functional configuration example of the service providing system according to the first embodiment.

FIG. 2 is a block diagram illustrating a functional configuration example of the service providing system (the client terminal 100, the authentication server 200, and the application server 300) according to the first embodiment. As illustrated in FIG. 2, the client terminal 100 includes, as its functional configuration, a certificate issuance request unit 101, a certificate recording unit 102, a first authentication request unit 103, a second authentication request unit 104, an application execution request unit 105, and an operation unit 106. In addition, the client terminal 100 includes a device information storage unit 111, a used IP address storage unit 112, and an issued certificate storage unit 113 as storage media.

Each of the functional blocks 101 to 106 can be configured by any of hardware, a digital signal processor (DSP), and software. For example, in the case of configuring each of the functional blocks 101 to 106 by software, each of the functional blocks 101 to 106 is configured to include a CPU of computer, a RAM, a ROM, and the like in practice, and is realized by operating a program stored in a recording medium, such as a RAM, a ROM, a hard disk, or a semiconductor memory.

The authentication server 200 includes a certificate issuing unit 201, a first authentication processing unit 202, and a second authentication processing unit 203 as its functional configuration. In addition, the authentication server 200 includes a user information storage unit 211, a registered IP address storage unit 212, and a certificate information storage unit 213 as storage media.

Each of the functional blocks 201 to 203 can be configured by any of hardware, a DSP, and software. For example, in the case of configuring each of the functional blocks 201 to 203 by software, each of the functional blocks 201 to 203 is configured to include a CPU of computer, a RAM, a ROM, and the like in practice, and is realized by operating a program stored in a recording medium, such as a RAM, a ROM, a hard disk, or a semiconductor memory.

The application server 300 includes an application execution unit 301 as its functional configuration. The application execution unit 301 can be configured by any of hardware, a DSP, and software. For example, in the case of configuring the application execution unit 301 by software, the application execution unit 301 is configured to include a CPU of computer, a RAM, a ROM, and the like in practice, and is realized by operating a program stored in a recording medium, such as a RAM, a ROM, a hard disk, or a semiconductor memory.

Note that, although the example in which the authentication server 200 and the application server 300 are configured as separate servers has been described herein, the invention is not limited thereto. For example, the application server 300 may be configured to include the authentication server 200.

First, storage media included in the client terminal 100 and the authentication server 200 will be described.

The device information storage unit 111 of the client terminal 100 stores device information unique to the client terminal 100. Although various kinds of device information are stored in the device information storage unit 111, device information used in the present embodiment is, for example, information indicating the type and version of a CPU and an OS (operating system) installed in the client terminal 100. In addition, in addition to these pieces of information, information regarding any of the presence or absence of a battery, a set screen resolution, and various devices (a memory, a storage, a chipset, and the like) installed may be used. A MAC address may be used. In short, any information capable of uniquely specifying the client terminal 100 may be used, and one piece of information or a combination of a plurality of pieces of information is used as device information.

The used IP address storage unit 112 stores an IP address being used in the client terminal 100. The IP address used in the client terminal 100 can change depending on a network at a base to which the client terminal 100 is connected. That is, the used IP address storage unit 112 stores an IP address derived from a network at a base to which the client terminal 100 is currently connected. Therefore, when the network at the base to which the client terminal 100 is connected is changed, the IP address stored in the used IP address storage unit 112 is also changed.

The issued certificate storage unit 113 stores a certificate issued in response to a request to the authentication server 200. Note that, once a certificate is issued, the certificate continues to be stored in the issued certificate storage unit 113 unless the user intentionally gives an instruction to delete the certificate.

The user information storage unit 211 of the authentication server 200 stores a user ID and a password, which have been issued for the user, for each user. It is assumed that a user ID/password is issued to a user in advance using a known method. For example, a user who desires to use an application service provided by the application server 300 applies for service use, a user ID/password set by the user or the application server 300 at the time of application is stored in the user information storage unit 211.

The registered IP address storage unit 212 registers and stores in advance an IP address that permits issuance of a certificate. As will be described later, in the present embodiment, the authentication server 200 permits issuance of a certificate only when a certificate issuance request is transmitted from the client terminal 100 which is using a specific IP address. The specific IP address is a fixed IP address used in a case where the client terminal 100 is connected to the in-house LAN 400 at the first base BS1.

The certificate information storage unit 213 stores a certificate, which is issued in response to a certificate issuance request from the client terminal 100, for each client terminal 100 so as to be associated with device information transmitted together with the certificate issuance request. Each time a certificate is issued, the certificate information storage unit 213 adds and stores a combination of the certificate and device information.

Next, the functional configurations of the client terminal 100, the authentication server 200, and the application server 300 will be described.

The operation unit 106 of the client terminal 100 is used by the user to give various instructions to the web browser of the client terminal 100 or to input various kinds of information. For example, by operating the operation unit 106, the user requests the authentication server 200 to issue a certificate, or requests the authentication server 200 to execute the first authentication, or requests the authentication server 200 to execute the second authentication. In addition, the user requests the application server 300 to execute an application service by operating the operation unit 106.

The certificate issuance request unit 101 of the client terminal 100 transmits the device information of the client terminal 100 stored in the device information storage unit 111 and the IP address stored in the used IP address storage unit 112 from the web browser to the authentication server 200 to make a request for issuance of a certificate. As will be described later, this certificate issuance request is valid when the client terminal 100 is connected to the in-house LAN 400 at the first base BS1 (issuance of a certificate is permitted), and is invalid when the client terminal 100 is connected to the external LAN 410 at the second base BS2 (issuance of a certificate is not permitted).

In response to the certificate issuance request from the certificate issuance request unit 101, the certificate issuing unit 201 of the authentication server 200 issues a certificate to the client terminal 100, and stores the issued certificate in the certificate information storage unit 213 so as to be associated with the device information transmitted together with the certificate issuance request. Here, the certificate issuing unit 201 compares the IP address transmitted from the client terminal 100 with a specific IP address stored in advance in the registered IP address storage unit 212. In a case where it is determined that the two IP addresses match, that is, in a case where it is determined that a certificate issuance request has been received together with a specific IP address used in the first base BS1, a certificate is issued.

The certificate recording unit 102 of the client terminal 100 receives the certificate issued by the certificate issuing unit 201 from the authentication server 200 as a response to the certificate issuance request from the certificate issuance request unit 101, and stores the received certificate in the issued certificate storage unit 113 that is a storage medium inside the terminal.

The first authentication request unit 103 of the client terminal 100 transmits the certificate stored in the issued certificate storage unit 113 from the web browser to the authentication server 200 together with the device information stored in the device information storage unit 111, thereby making a request for the first authentication. The request for the first authentication is valid both when the client terminal 100 is connected to the in-house LAN 400 at the first base BS1 and when the client terminal 100 is connected to the external LAN 410 at the second base BS2 (in a case where there is a request for the first authentication from the legitimate client terminal 100 for which a certificate has been issued, the authentication is successful).

In response to the request from the first authentication request unit 103, the first authentication processing unit 202 of the authentication server 200 performs first authentication processing by comparing the certificate and the device information transmitted from the client terminal 100 with a certificate and device information stored in the certificate information storage unit 213, and notifies the client terminal 100 of the result of success or failure.

As described above, when there is a request for the first authentication from the legitimate client terminal 100 for which a certificate has been issued, the first authentication is successful because the certificate and the device information transmitted to the authentication server 200 match the certificate and the device information stored in the certificate information storage unit 213. On the other hand, when there is a request for the first authentication from an illegitimate client terminal using the certificate stolen from the client terminal 100, the first authentication is unsuccessful because the device information transmitted to the authentication server 200 in combination with the certificate does not match the device information stored in the certificate information storage unit 213 in combination with the certificate.

In a case where it is determined that the first authentication is unsuccessful, the first authentication processing unit 202 invalidates the same certificate as the certificate transmitted from the client terminal 100 together with the request for the first authentication among certificates stored in the certificate information storage unit 213. Invalidation of a certificate is performed by deleting (discarding) the certificate from the certificate information storage unit 213, for example. Alternatively, the invalidation may be performed using a method of adding flag information indicating invalid to the certificate. Thus, in a case where there is a request for the first authentication by access from the illegitimate client terminal 100, security can be further strengthened by invalidating the certificate used for the request.

After the first authentication request unit 103 receives a notification that the first authentication is successful from the authentication server 200, the second authentication request unit 104 of the client terminal 100 transmits a user ID and a password, which have been input by operating the operation unit 106 by the user, from the web browser to the authentication server 200, thereby making a request for the second authentication.

In response to the request from the second authentication request unit 104, the second authentication processing unit 203 of the authentication server 200 performs second authentication processing by comparing the user ID and the password transmitted from the client terminal 100 with a user ID and a password stored in advance in the user information storage unit 211, and notifies the client terminal 100 of the result of success or failure.

Here, in addition to the user ID/password comparison, the second authentication processing unit 203 performs the second authentication processing by checking whether or not at least one of the user ID and the password transmitted from the client terminal 100 is associated with the certificate used for the first authentication. Note that, the association between at least one of the user ID and the password and the certificate is executed at the first login when making a request to issue the certificate.

That is, in the present embodiment, before a certificate issuance request is made by the certificate issuance request unit 101, a user ID and a password are transmitted to the authentication server 200 to log in. This login is the first login performed first after the user ID/password is issued to the user. That is, before a certificate issuance request is made by the certificate issuance request unit 101, the user makes a request for the second authentication using the second authentication request unit 104, and receives the second authentication from the second authentication processing unit 203 and logs in. Then, in this state, a certificate issuance request is made by the certificate issuance request unit 101, and the certificate is issued by the certificate issuing unit 201.

Here, after the second authentication is successful at the first login, the certificate issuing unit 201 issues a certificate in response to a certificate issuance request from the certificate issuance request unit 101, and stores the issued certificate in the certificate information storage unit 213 so as to be associated with the device information and stores association information, in which the issued certificate is associated with at least one of the user ID and the password used at the first login, in the certificate information storage unit 213. The second authentication processing unit 203 notifies the certificate issuing unit 201 of at least one of the user ID and the password used at the first login when the first login is successful.

At the first login, the second authentication processing unit 203 performs the second authentication processing by comparing the user ID and the password transmitted from the client terminal 100 with a user ID and a password stored in advance in the user information storage unit 211. On the other hand, at the second and subsequent logins, the second authentication processing unit 203 performs the second authentication processing by comparing the user ID and the password transmitted from the client terminal 100 with a user ID and a password stored in advance in the user information storage unit 211 and checking whether or not at least one of the user ID and the password transmitted from the client terminal 100 is associated with the certificate used for the first authentication based on the association information stored in the certificate information storage unit 213.

When both the first authentication and the second authentication are successful, the client terminal 100 can access the application server 300 to use the application service. In this state, the application execution request unit 105 of the client terminal 100 requests the application server 300 to execute a desired application service from the web browser. The application execution unit 301 of the application server 300 executes the processing of the application service requested by the application execution request unit 105, and provides the result to the web browser of the client terminal 100.

Figure 3:
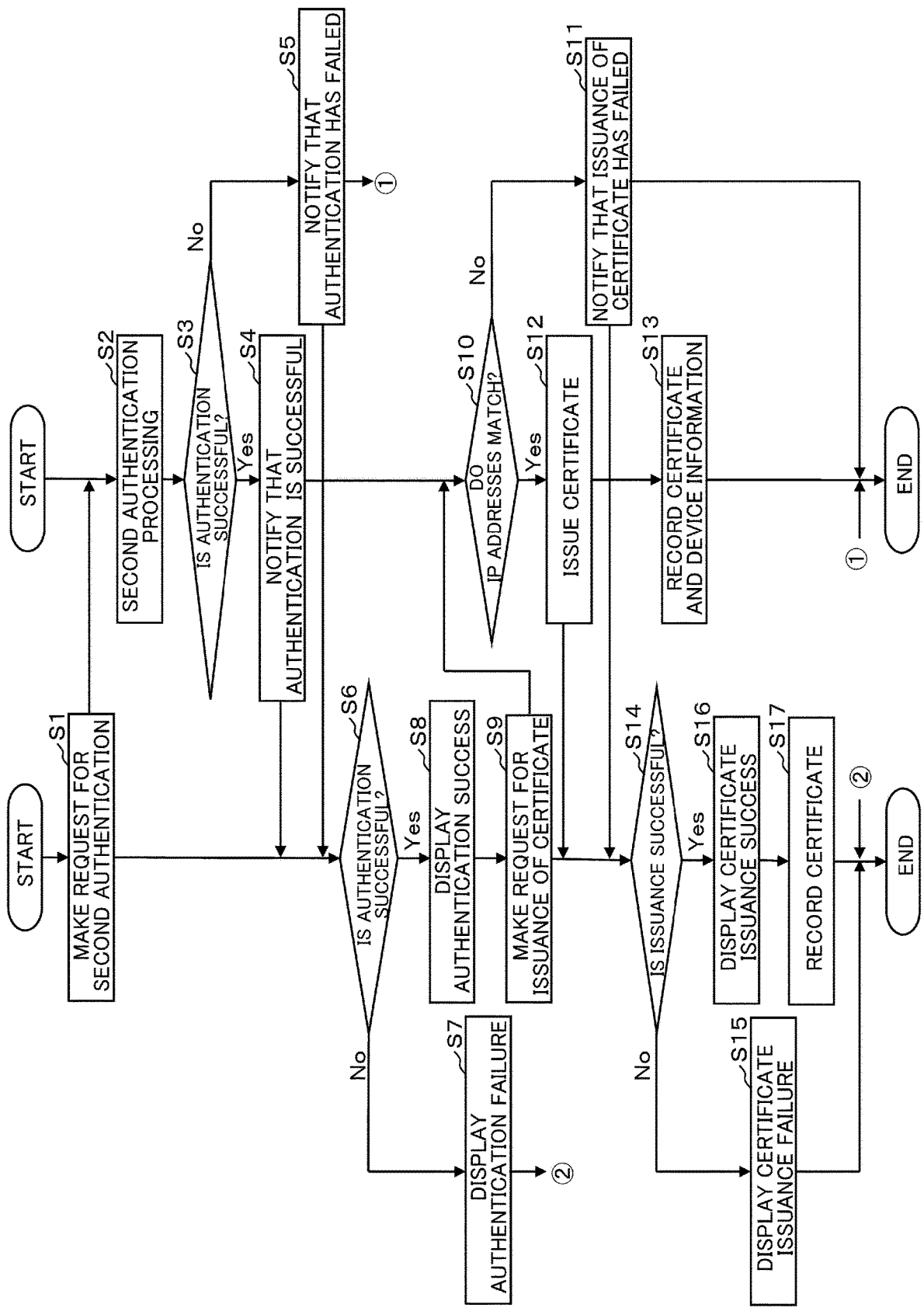
FIG. 3 is a flowchart illustrating an operation example at the time of certificate issuance of the authentication system according to the first embodiment.
Figure 4:
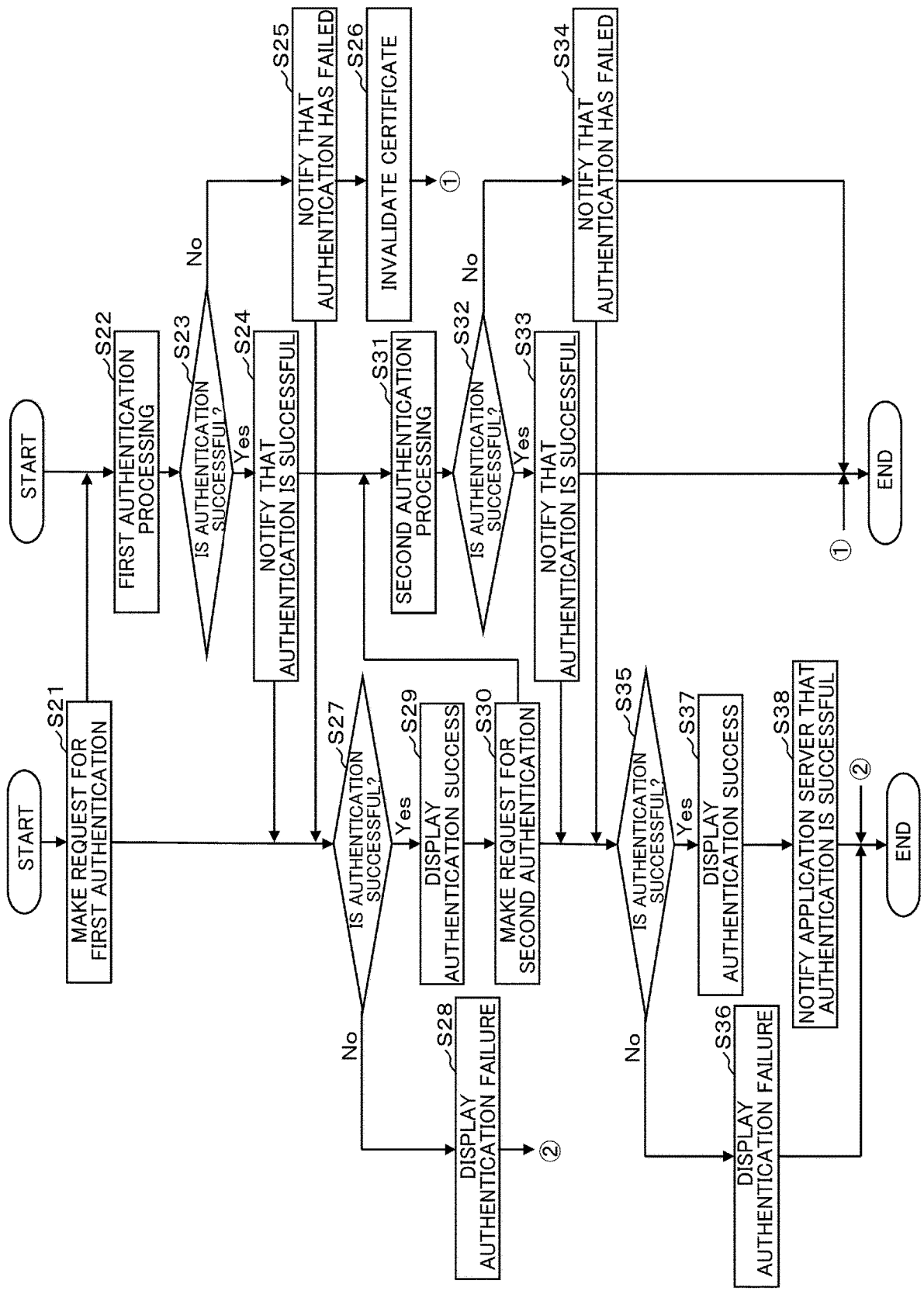
FIG. 4 is a flowchart illustrating an operation example at the time of authentication processing of the authentication system according to the first embodiment.

FIGS. 3 and 4 are flowcharts illustrating an operation example of the authentication system (the client terminal 100 and the authentication server 200) configured as described above. Between these, FIG. 3 is a flowchart illustrating an operation example at the time of certificate issuance, and FIG. 4 is a flowchart illustrating an operation example at the time of authentication processing.

In FIG. 3, first, the second authentication request unit 104 of the client terminal 100 transmits a user ID and a password input by the user to the authentication server 200 to make a request for the second authentication (step S1). In response to the request from the second authentication request unit 104, the second authentication processing unit 203 of the authentication server 200 performs second authentication processing by comparing the user ID and the password transmitted from the client terminal 100 with a user ID and a password stored in advance in the user information storage unit 211 (step S2).

Here, the second authentication processing unit 203 determines whether or not the second authentication is successful (step S3). In a case where the second authentication is successful (step S3: Yes), the client terminal 100 is notified that the authentication is successful (step S4). As a result, the first login from the client terminal 100 to the authentication server 200 is completed. On the other hand, in a case where the second authentication has failed (step S3: No), the client terminal 100 is notified that the authentication has failed (step S5). As a result, the processing of the authentication server 200 ends.

The second authentication request unit 104 of the client terminal 100 receives a notification of the result of success or failure of the second authentication from the authentication server 200, and determines whether or not the second authentication is successful (step S6). Here, in a case where a notification that the second authentication has failed is received from the authentication server 200 (step S6: No), the second authentication request unit 104 displays an error message indicating an authentication failure (step S7), and ends the processing of the client terminal 100.

On the other hand, in a case where a notification that the second authentication is successful is received from the authentication server 200 (step S6: Yes), the second authentication request unit 104 displays a message indicating the success of authentication (step S8). In response to this, the user operates the operation unit 106 to give an instruction of a certificate issuance request. Then, the certificate issuance request unit 101 transmits the device information of the client terminal 100 stored in the device information storage unit 111 and the IP address stored in the used IP address storage unit 112 to the authentication server 200 to make a request for issuance of a certificate (step S9).

The certificate issuing unit 201 of the authentication server 200 compares the IP address transmitted from the client terminal 100 with a specific IP address stored in advance in the registered IP address storage unit 212 to determine whether or not the two IP addresses match (step S10). Here, in a case where the two IP addresses do not match (step S10: No), the client terminal 100 is notified that the issuance of a certificate has failed (step S11). As a result, the processing of the authentication server 200 ends.

On the other hand, in a case where the two IP addresses match (step S10: Yes), the certificate issuing unit 201 issues a certificate to the client terminal 100 (step S12), and stores the issued certificate in the certificate information storage unit 213 so as to be associated with the device information transmitted together with the certificate issuance request (step S13). As a result, the processing of the authentication server 200 ends.

In the client terminal 100, after the certificate issuance request unit 101 makes a request for issuance of a certificate, the certificate recording unit 102 determines whether or not the certificate has been transmitted from the authentication server 200 (step S14). Here, in a case where a notification that the issuance of a certificate has failed is received (step S14: No), the certificate recording unit 102 displays an error message indicating a certificate issuance failure (step S15), and ends the processing of the client terminal 100.

On the other hand, in a case where the certificate recording unit 102 receives a certificate from the authentication server 200 (step S14: Yes), the certificate recording unit 102 displays a message indicating a certificate issuance success (step S16), and stores the received certificate in the issued certificate storage unit 113 (step S17). As a result, the processing of the client terminal 100 ends.

In FIG. 4, first, the first authentication request unit 103 of the client terminal 100 transmits the certificate stored in the issued certificate storage unit 113 to the authentication server 200 together with the device information stored in the device information storage unit 111, thereby making a request for the first authentication (step S21). In response to the request from the first authentication request unit 103, the first authentication processing unit 202 of the authentication server 200 performs first authentication processing by comparing the certificate and the device information transmitted from the client terminal 100 with a certificate and device information stored in the certificate information storage unit 213 (step S22).

Here, the first authentication processing unit 202 determines whether or not the first authentication is successful (step S23). In a case where the first authentication is successful (step S23: Yes), the client terminal 100 is notified that the authentication is successful (step S24). On the other hand, in a case where the first authentication has failed (step S23: No), the client terminal 100 is notified that the authentication has failed (step S25), and the same certificate as the certificate transmitted from the client terminal 100 together with the request for the first authentication, among certificates stored in the certificate information storage unit 213, is invalidated (step S26). As a result, the processing of the authentication server 200 ends.

The first authentication request unit 103 of the client terminal 100 receives a notification of the result of success or failure of the first authentication from the authentication server 200, and determines whether or not the first authentication is successful (step S27). Here, in a case where a notification that the first authentication has failed is received from the authentication server 200 (step S27: No), the first authentication request unit 103 displays an error message indicating an authentication failure (step S28), and ends the processing of the client terminal 100.

On the other hand, in a case where a notification that the first authentication is successful is received from the authentication server 200 (step S27: Yes), the first authentication request unit 103 displays a message indicating the success of authentication (step S29). In response to this, the user operates the operation unit 106 to input a user ID/password and gives an instruction of a second authentication request, the second authentication request unit 104 transmits the user ID and the password input by the user to the authentication server 200 to make a request for the second authentication (step S30).

In response to the request from the second authentication request unit 104, the second authentication processing unit 203 of the authentication server 200 performs the second authentication processing by comparing the user ID and the password transmitted from the client terminal 100 with a user ID and a password stored in advance in the user information storage unit 211 and checking whether or not at least one of the user ID and the password transmitted from the client terminal 100 is associated with the certificate used for the first authentication (step S31).

Here, the second authentication processing unit 203 determines whether or not the second authentication is successful (step S32). In a case where the second authentication is successful (step S32: Yes), the client terminal 100 is notified that the second authentication is successful (step S33). On the other hand, in a case where the second authentication has failed (step S32: No), the client terminal 100 is notified that the authentication has failed (step S34). As a result, the processing of the authentication server 200 ends.

The second authentication request unit 104 of the client terminal 100 receives a notification of the result of success or failure of the second authentication from the authentication server 200, and determines whether or not the second authentication is successful (step S35). Here, in a case where a notification that the second authentication has failed is received from the authentication server 200 (step S35: No), the second authentication request unit 104 displays an error message indicating an authentication failure (step S36), and ends the processing of the client terminal 100.

On the other hand, in a case where a notification that the second authentication is successful is received from the authentication server 200 (step S35: Yes), the second authentication request unit 104 displays a message indicating the success of authentication (step S37), and notifies the application server 300 that the second authentication is successful (step S38). As a result, the processing relevant to the authentication of the client terminal 100 ends. With this notification, the client terminal 100 can access the application server 300 to use a desired application service.

As described above in detail, in the first embodiment, the authentication server 200 issues a certificate in response to a request from the client terminal 100, and the issued certificate is stored in a storage medium inside the client terminal 100. Then, the certificate stored in the storage medium is transmitted from the client terminal 100 to the authentication server 200 together with the device information to execute the first authentication. Then, after the first authentication is successful, the user ID and the password are transmitted from the client terminal 100 to the authentication server 200 to execute the second authentication.

According to the present embodiment configured as described above, when necessary for each client terminal 100 that desires to be authenticated, by transmitting a certificate issuance request to the authentication server 200 to issue a certificate and storing the certificate in the client terminal 100, it is possible to perform the first authentication using the certificate at an arbitrary timing thereafter and perform the second authentication using the user ID/password after the first authentication.

Therefore, it is possible to perform the first authentication using a certificate and perform the second authentication using a user ID/password without setting up the service usage environment in which the certificate of the client terminal 100 and the user ID/password are stored in advance in the authentication server 200 so as to be associated with each other and the client certificate is stored in advance in each client terminal 100. Then, such issuance and authentication of the certificate can be performed using the web browser of the client terminal 100.

Therefore, according to the present embodiment, it is possible to realize high security without special setup by using a terminal authentication technique without using a mechanism, such as IP restriction or a VPN.

In addition, in the present embodiment, since a certificate is issued only in a case where there is a request from the client terminal 100 using a specific IP address (IP address used in the in-house LAN 400 at the first base BS1), no certificate can be issued to a third party who cannot use the in-house LAN 400 legitimately. Even in a case where a third party steals a certificate that has been legitimately issued to a user who can legitimately use the in-house LAN 400, when there is a request for the first authentication from the client terminal of the third party, the authentication fails due to mismatch of device information. In a case where a third party tries to receive authentication illegitimately, it is necessary to steal the user's client terminal 100 and steal the user ID/password, which makes the attack very difficult.

Second Embodiment

Figure 5:
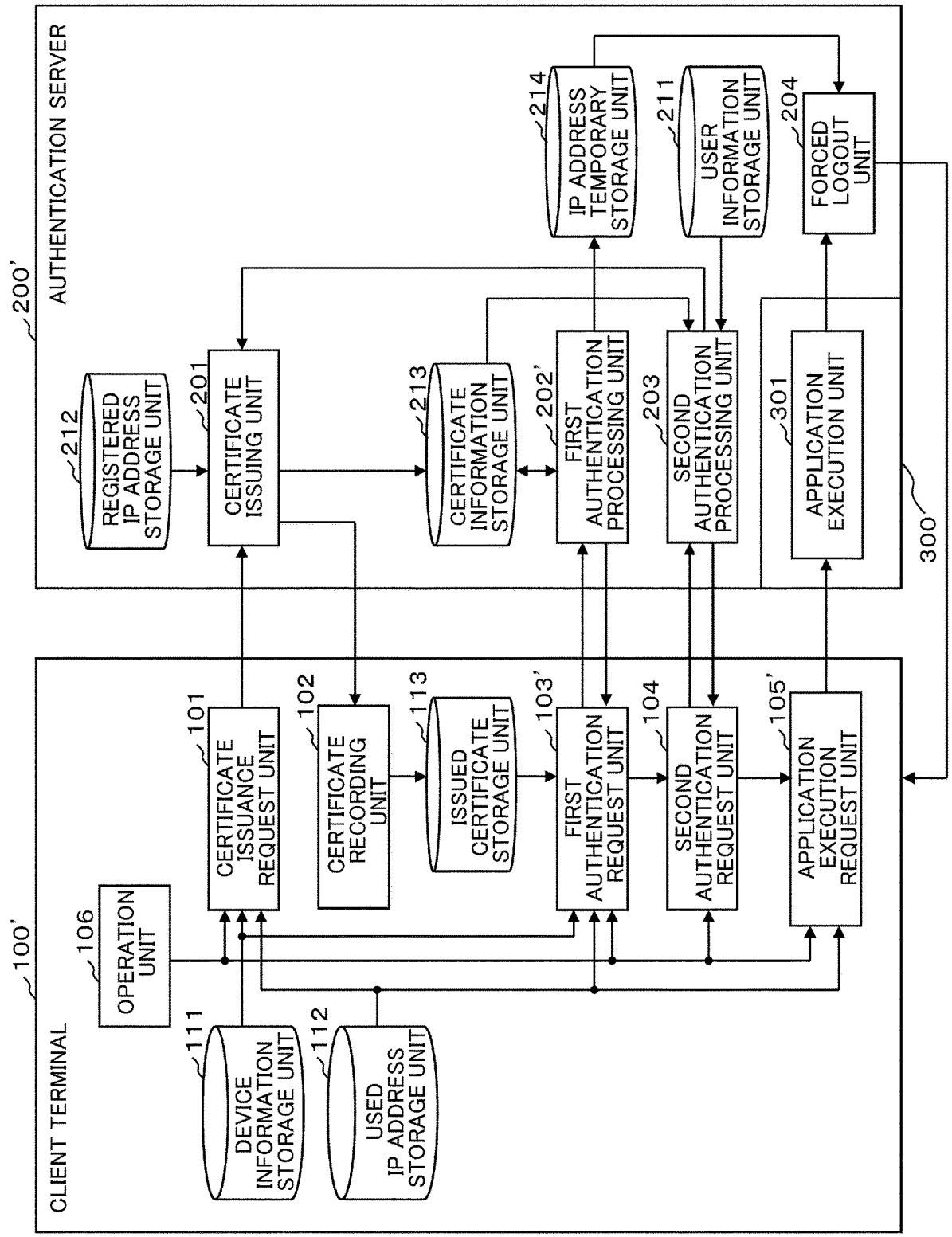
FIG. 5 is a diagram illustrating a functional configuration example of a service providing system according to a second embodiment.

Next, a second embodiment of the invention will be described with reference to diagrams. FIG. 5 is a block diagram illustrating a functional configuration example of a service providing system according to the second embodiment. Note that, in FIG. 5, those having the same reference numerals as those illustrated in FIG. 2 have the same functions, and accordingly repeated explanation will be omitted herein.

As illustrated in FIG. 5, a client terminal 100' according to the second embodiment includes a first authentication request unit 103' and an application execution request unit 105' instead of the first authentication request unit 103 and the application execution request unit 105. In addition, an authentication server 200' according to the second embodiment includes a first authentication processing unit 202' instead of the first authentication processing unit 202, and further includes a forced logout unit 204 and an IP address temporary storage unit 214.

When making a request for the first authentication, the first authentication request unit 103' transmits an IP address stored in the used IP address storage unit 112 to the authentication server 200'. The first authentication processing unit 202' stores the IP address transmitted at the time of the authentication request in the IP address temporary storage unit 214.

The forced logout unit 204 determines whether or not the IP address transmitted at the time of access to the application server 300 from the application execution request unit 105' of the client terminal 100' after the first authentication and the second authentication are successful matches the IP address stored in the IP address temporary storage unit 214, and performs forced logout in a case where the IP addresses do not match.

According to the second embodiment configured as described above, even in a case where the client terminal 100' in a login state is stolen by a third party, security can be ensured by forced logout. That is, after the client terminal 100' is stolen, when a network that uses the client terminal 100' changes, the IP address changes. Therefore, when an attempt is made to access the application server 300 using the changed IP address, forced logout is performed due to the IP address mismatch. As a result, it is possible to prevent a third party from accessing the application server 300.

Note that, although the example in which the first authentication request unit 103' transmits an IP address to the authentication server 200' when making a request for the first authentication and the first authentication processing unit 202' stores the IP address in the IP address temporary storage unit 214 has been described herein, the invention is not limited thereto. For example, a second authentication request unit 104' may transmit an IP address to the authentication server 200' when making a request for the second authentication, and a second authentication processing unit 203' may store the IP address in the IP address temporary storage unit 214. Alternatively, the above-described processing may be performed at the time of both the request for the first authentication and the request for the second authentication.

In the first and second embodiments, the configuration has been described in which the certificate issued at the first login is associated with at least one of the user ID and the password and at the second and subsequent logins, the second authentication processing is performed by checking whether or not at least one of the user ID and the password transmitted from the client terminal 100 is associated with the certificate used for the first authentication in addition to checking the user ID/password. That is, although the example has been described in which the association between the first authentication and the second authentication is performed based on the association information generated at the first login, the invention is not limited thereto.

For example, only in a case where the first authentication by the first authentication processing unit 202 (202') is successful, the second authentication processing unit 203 provides the web browser of the client terminal 100 (100') with an authentication information input screen for prompting a user ID and a password to be input. Then, the second authentication request unit 104 may receive the authentication information input screen and transmit the user ID and the password input by the user through the authentication information input screen to the authentication server 200 (200') to make a request for the second authentication. In this manner, it is not necessary to generate association information for associating the first authentication and the second authentication with each other.

In addition, although the example in which a certificate is issued only in a case where there is a certificate issuance request from the client terminal 100 (100') using a specific IP address has been described in the first and second embodiments, the invention is not limited thereto. For example, the certificate issuing unit 201 may issue a certificate in a case where a certificate issuance request is received within a predetermined time after a certificate issuance request reception standby state is set by a predetermined operation of the user.

Specifically, the authentication server 200 (200') is connected to the in-house LAN 400. The certificate issuing unit 201 issues a certificate only in a case where the user sets the certificate issuance request reception standby state by directly operating the authentication server 200 (200'), and then a certificate issuance request is made from the client terminal 100 (100') connected to the same in-house LAN 400 within a predetermined time. In this manner, since a certificate cannot be issued unless the user is physically present at the first base BS1, a third party cannot receive a certificate illegitimately. Note that, instead of the form in which the user directly operates the authentication server 200 (200'), the user may set the certificate issuance request reception standby state by operating an operation unit for reception standby state setting connected to the authentication server 200 (200').

In addition, in the first and second embodiments, the configuration has been described in which a certificate once issued is continuously stored in the issued certificate storage unit 113 unless the user intentionally deletes the certificate once issued. However, an expiration date may be set for each user.

In addition, each of the first and second embodiments is merely an example of implementation in carrying out the invention, and the technical scope of the invention should not be interpreted in a limited manner. That is, the invention can be implemented in various forms without departing from the gist or the main features thereof.

What is claimed is:

1. An authentication system comprising:
   a client terminal having a web browser; and
   an authentication server that performs authentication in response to a request from the client terminal,
   wherein the client terminal includes:
   a certificate issuance request unit that transmits device information of the client terminal from the web browser to the authentication server to make a request for issuance of a certificate;
   a certificate recording unit that receives a certificate issued from the authentication server as a response to the certificate issuance request from the certificate issuance request unit and stores the certificate in a storage medium inside the terminal;
   a first authentication request unit that transmits the certificate stored in the storage medium from the web browser to the authentication server together with the device information to make a request for first authentication; and
   a second authentication request unit that transmits a user ID and a password input by a user from the web browser to the authentication server to make a request for second authentication after the first authentication request unit receives a notification that the first authentication is successful from the authentication server, and
   the authentication server includes:
   a certificate issuing unit that issues the certificate to the client terminal in response to the certificate issuance request from the certificate issuance request unit and stores the issued certificate in a certificate information storage unit so as to be associated with the device information transmitted together with the certificate issuance request;
   a first authentication processing unit that performs first authentication processing by comparing the certificate and the device information transmitted from the client terminal with a certificate and device information stored in the certificate information storage unit in response to the request from the first authentication request unit and notifies the client terminal of a result of success or failure of the first authentication processing;
   a second authentication processing unit that performs second authentication processing by comparing the user ID and the password transmitted from the client terminal with a user ID and a password, which are stored in advance in a user information storage unit, in response to the request from the second authentication request unit and notifies the client terminal of a result of success or failure of the second authentication processing; and
   wherein the second authentication processing unit performs the second authentication processing by comparing the user ID and the password transmitted from the client terminal with the user ID and the password stored in advance in the user information storage unit at first login, and performs the second authentication processing by comparing the user ID and the password transmitted from the client terminal with the user ID and the password stored in advance in the user information storage unit and checking whether or not at least one of the user ID and the password transmitted from the client terminal is associated with a certificate used for the first authentication at second and subsequent logins, and
   after the second authentication is successful at the first login, the certificate issuing unit issues the certificate in response to the certificate issuance request from the certificate issuance request unit and stores the issued certificate in the certificate information storage unit so as to be associated with the device information and stores association information, in which the issued certificate is associated with at least one of the user ID and the password used at the first login, in the certificate information storage unit.

2. The authentication system according to claim 1, wherein the second authentication processing unit provides the web browser of the client terminal with an authentication information input screen for prompting the user ID and the password to be input only in a case where the first authentication is successful, and
   the second authentication request unit receives the authentication information input screen and transmits the user ID and the password input by the user through the authentication information input screen to the authentication server to make a request for the second authentication.

3. The authentication system according to claim 1, wherein the certificate issuance request unit transmits an IP address to the authentication server together with the device information to make a request for issuance of a certificate, and
   the certificate issuing unit compares the IP address transmitted from the client terminal with a specific IP address stored in advance in a registered IP address storage unit, and issues the certificate in a case where it is determined that the certificate issuance request has been received together with the specific IP address.

4. The authentication system according to claim 1, wherein the certificate issuing unit issues the certificate in a case where the certificate issuance request is received within a predetermined time after a standby state for receiving the certificate issuance request is set by a predetermined operation of the user.

5. The authentication system according to claim 1, wherein the first authentication processing unit invalidates the same certificate as the certificate transmitted from the client terminal, among certificates stored in the certificate information storage unit, in a case where it is determined that the first authentication is unsuccessful.

6. The authentication system according to claim 1, wherein at least one of the first authentication request unit and the second authentication request unit transmits an IP address to the authentication server at the time of an authentication request,
at least one of the first authentication processing unit and the second authentication processing unit stores the IP address transmitted at the time of the authentication request in a temporary storage unit, and
the authentication server further includes a forced logout unit that determines whether or not an IP address transmitted at the time of access to the web server from the client terminal after the first authentication and the second authentication are successful matches the IP address stored in the temporary storage unit and performs forced logout in a case where the IP addresses do not match.

7. An authentication server that performs authentication in response to a request from a client terminal having a web browser, comprising:
a certificate issuing unit that issues a certificate to the client terminal in response to a certificate issuance request transmitted together with device information of the client terminal and stores the issued certificate in a certificate information storage unit so as to be associated with the device information;
a first authentication processing unit that performs first authentication processing by comparing the certificate and the device information transmitted from the client terminal with a certificate and device information stored in the certificate information storage unit in response to a first authentication request transmitted together with the certificate issued by the certificate issuing unit and the device information and notifies the client terminal of a result of success or failure of the first authentication processing; and
a second authentication processing unit that performs second authentication processing by comparing a user ID and a password transmitted from the client terminal with a user ID and a password, which are stored in advance in a user information storage unit, in response to a second authentication request transmitted from the client terminal together with the user ID and the password after the client terminal is notified that the first authentication is successful, and notifies the client terminal of a result of success or failure of the second authentication processing; and
wherein the second authentication processing unit performs the second authentication processing by comparing the user ID and the password transmitted from the client terminal with the user ID and the password stored in advance in the user information storage unit at first login, and performs the second authentication processing by comparing the user ID and the password transmitted from the client terminal with the user ID and the password stored in advance in the user information storage unit and checking whether or not at least one of the user ID and the password transmitted from the client terminal is associated with a certificate used for the first authentication at second and subsequent logins, and
after the second authentication is successful at the first login, the certificate issuing unit issues the certificate in response to the certificate issuance request from the certificate issuance request unit and stores the issued certificate in the certificate information storage unit so as to be associated with the device information and stores association information, in which the issued certificate is associated with at least one of the user ID and the password used at the first login, in the certificate information storage unit.

8. An authentication method in an authentication system configured to include a client terminal having a web browser and an authentication server that performs authentication in response to a request from the client terminal, comprising:
a first step in which a certificate issuance request unit of the client terminal transmits device information of the client terminal from the web browser to the authentication server to make a request for issuance of a certificate;
a second step in which a certificate issuing unit of the authentication server issues the certificate to the client terminal in response to the certificate issuance request from the certificate issuance request unit and stores the issued certificate in a certificate information storage unit so as to be associated with the device information transmitted together with the certificate issuance request;
a third step in which a certificate recording unit of the client terminal receives a certificate issued from the authentication server as a response to the certificate issuance request from the certificate issuance request unit and stores the certificate in a storage medium inside the terminal;
a fourth step in which a first authentication request unit of the client terminal transmits the certificate stored in the storage medium from the web browser to the authentication server together with the device information to make a request for first authentication;
a fifth step in which a first authentication processing unit of the authentication server performs first authentication processing by comparing the certificate and the device information transmitted from the client terminal with a certificate and device information stored in the certificate information storage unit in response to the request from the first authentication request unit and notifies the client terminal of a result of success or failure of the first authentication processing;
a sixth step in which a second authentication request unit of the client terminal transmits a user ID and a password input by a user from the web browser to the authentication server to make a request for second authentication after the first authentication request unit receives a notification that the first authentication is successful from the authentication server; and
a seventh step in which a second authentication processing unit of the authentication server performs second authentication processing by comparing the user ID and the password transmitted from the client terminal with a user ID and a password, which are stored in advance in a user information storage unit, in response to the request from the second authentication request unit and notifies the client terminal of a result of success or failure of the second authentication processing; and wherein the second authentication processing unit performs the second authentication processing by comparing the user ID and the password transmitted from the client terminal with the user ID and the password stored in advance in the user information storage unit at first login, and performs the second authentication processing by comparing the user ID and the password transmitted from the client terminal with the user ID and the password stored in advance in the user information storage unit and checking whether or not at least one of the user ID and the password transmitted from the client terminal is associated with a certificate used for the first authentication at second and subsequent logins, and after the second authentication is successful at the first login, the certificate issuing unit issues the certificate in response to the certificate issuance request from the certificate issuance request unit and stores the issued certificate in the certificate information storage unit so as to be associated with the device information and stores association information, in which the issued certificate is associated with at least one of the user ID and the password used at the first login, in the certificate information storage unit.

* * * * *